Patented Jan. 5, 1932

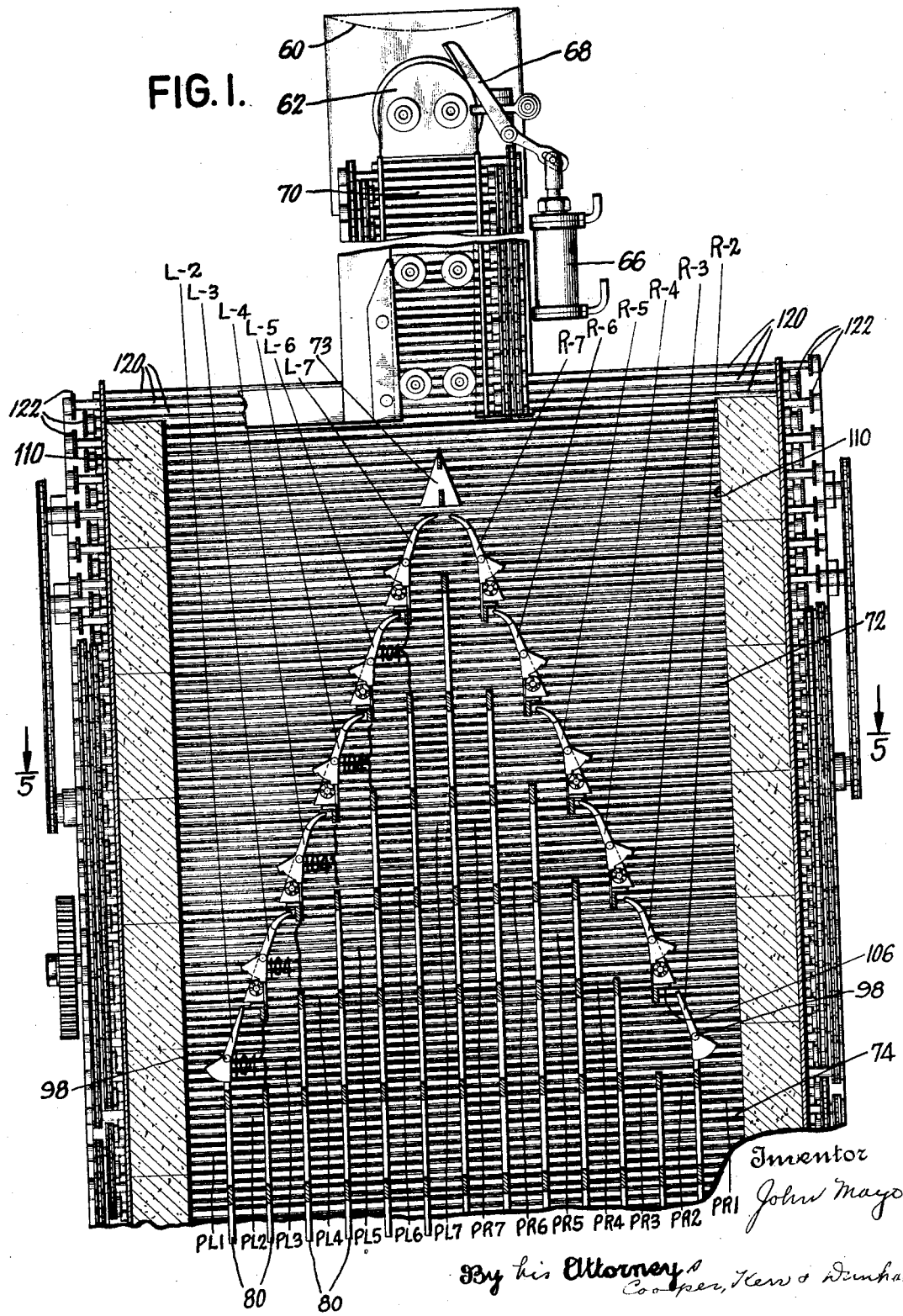

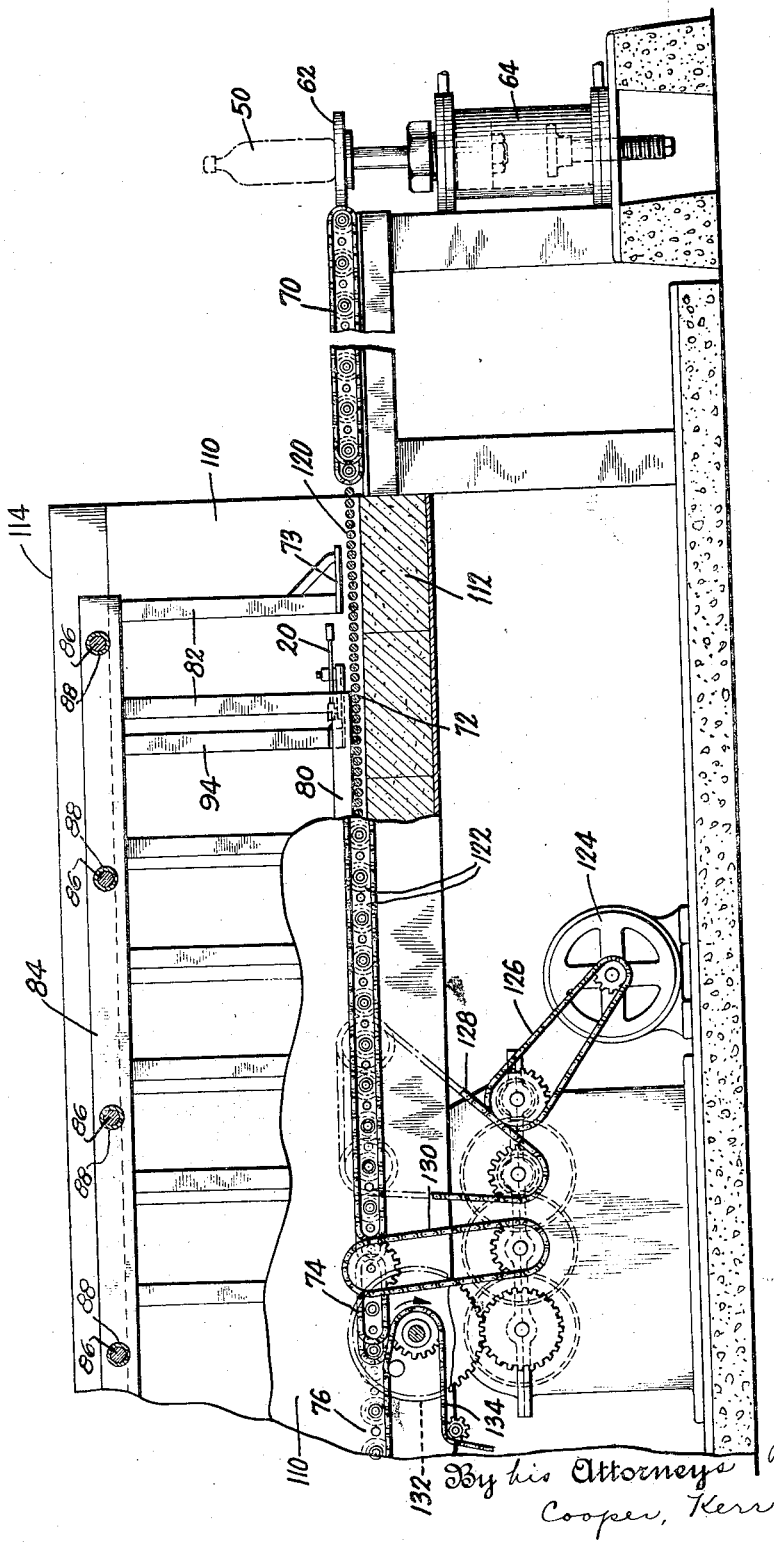

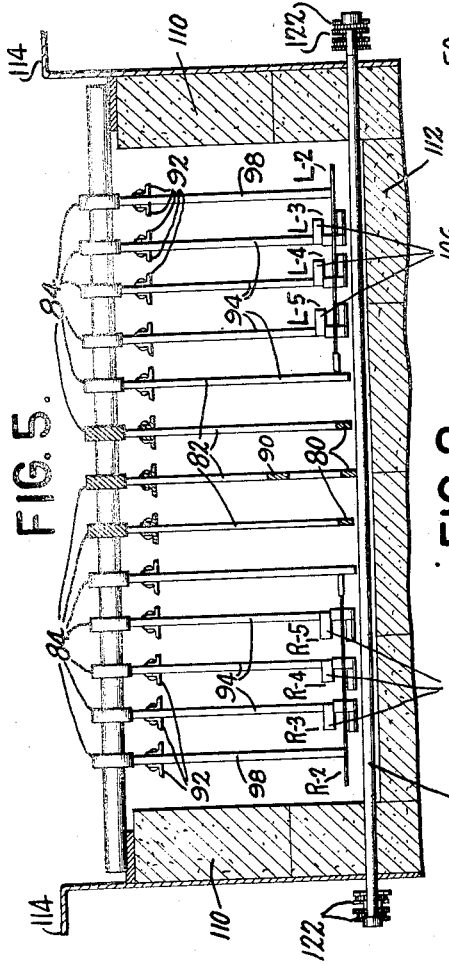
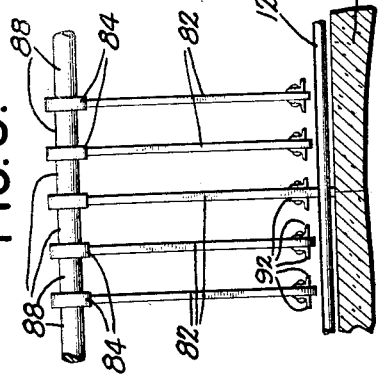
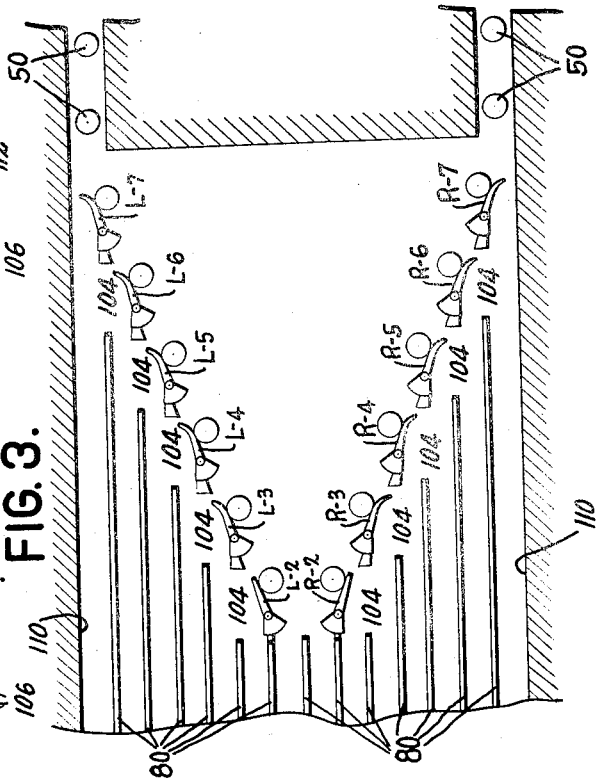
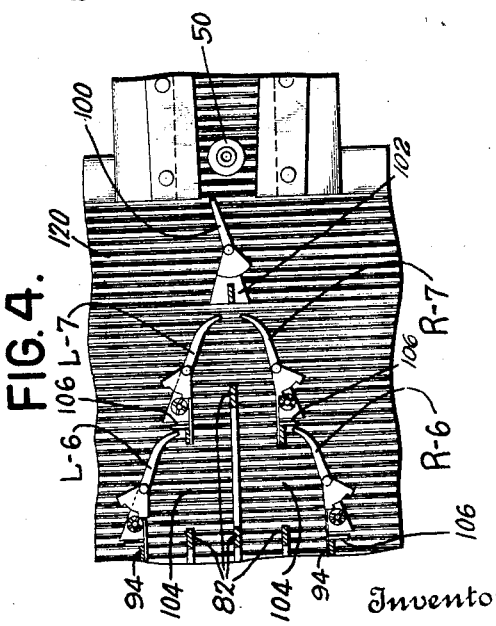

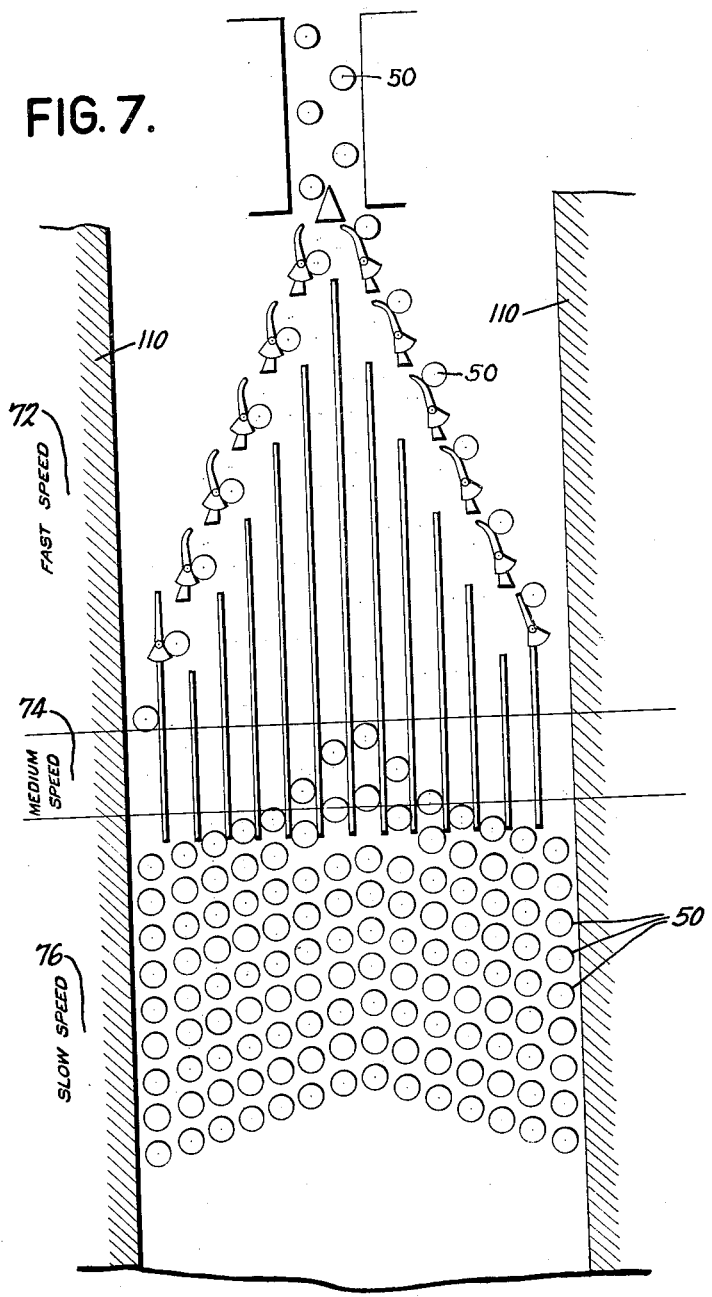

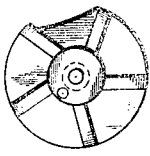
FIG.12.
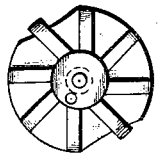
FIG.13.
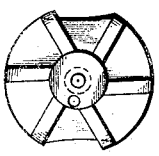
FIG.14.
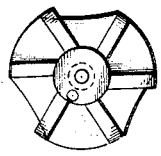
FIG.15.
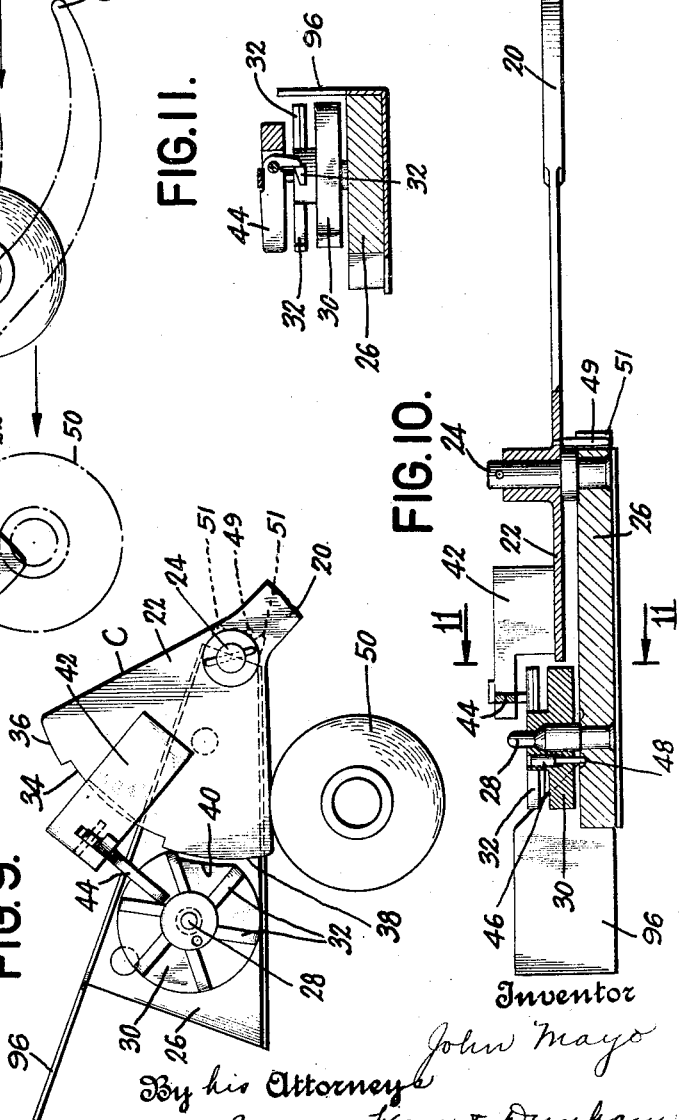

1,839,327

UNITED STATES PATENT OFFICE

JOHN MAYO, OF FAIRMONT, WEST VIRGINIA, ASSIGNOR OF ONE-HALF TO THERMAL ENGINEERING CORPORATION, OF PITTSBURGH, PENNSYLVANIA, A CORPORATION OF NEW YORK

DISTRIBUTOR FOR LEERS

Application filed August 22, 1928. Serial No. 301,283.

This invention pertains to annealing furnaces, or leers, used in the manufacture of glass articles such as bottles, tumblers, fruit jars, table ware, etc., and has particular reference to the means used for arranging or distributing the ware on the leer conveyor within the leer.

The present invention is an improvement on the distributing system disclosed in the copending application of Orie Shackelford, Serial No. 187,470, filed April 29, 1927.

In that application the distrbutor comprises a series of deflectors or "ushers" operable by the glassware itself while being carried along by the conveyor, the pieces of ware passing alternately to right and left of each usher.

An object of the present invention is to provide a distributor which will "stack" the ware in rows of any desired number of pieces across the leer.

Another object is to cause the ware to travel to a great extent in straight lines, thereby permitting the use of guide rails, which are an advantage under certain conditions as for instance when handling ware which tips over readily.

Another object is to provide means for readily adjusting the widths of the guide passages to accommodate different kinds of ware.

Another object is to provide a distributor which will operate at very high speed rendered possible by the straight line movement of the ware.

Another object is to provide a distributor in which all parts likely to need attention while the machine is in operation are readily accessible at all times.

Further and other objects and advantages will be hereinafter set forth in the accompanying specification and claims, and shown in the drawings, which by way of illustration show what is now considered to be the preferred embodiment of the invention.

Fig. 1 is a sectional plan view of a distributor arrangement for handling bottles received from two machines and entering the leer in a double row.

Fig. 2 is a side view of Fig. 1, partly in section, showing the conveyor drive and method of decreasing the conveyor speed in two steps.

Fig. 3 is a diagrammatic showing of another arrangement for handling the output of two machines.

Fig. 4 shows how bottles received in a single stream may be distributed across the full width of the leer.

Fig. 5 is a cross-section, on the line 5—5 of Fig. 1.

Fig. 6 is a detail showing use of auxiliary guide rails to provide narrow passages.

Fig. 7 is a diagrammatic view showing how the distributor rearranges the formation of the longitudinal streams of ware entering the leer into rows crosswise of the leer.

Fig. 8 shows an usher in various positions. This usher has a counting wheel arranged to pass every seventh bottle.

Fig. 9 is a plan of my counting usher in one extreme position.

Fig. 10 is a sectional view on the line 10—10 of Fig. 8.

Fig. 11 is a sectional view on the line 11—11 of Fig. 10.

Fig. 12 shows a counter wheel which passes every sixth bottle.

Fig. 13 shows a counter wheel which passes every fifth bottle.

Fig. 14 shows a counterwheel which passes every fourth bottle.

Fig. 15 shows a counter wheel which passes every third bottle.

In the Shackleford leer each usher is simply a deflector comprising a finger with a fanlike tail portion attached thereto. The deflector is pivoted on a vertical pin and the advancing ware oscillates the usher back and forth so that the pieces of ware are deflected alternately to the right and left. The same number of pieces go on one side as on the other.

In the present invention each usher is provided with a counting device in the form of a wheel which so controls the usher as to cause any predetermined number of bottles to pass on one side of the usher before one bottle is permitted to pass on the other side. Then the same predetermined number must again pass on the first side before another is permitted to pass on the other side, and so on.

An understanding of the design and operation of this usher may be obtained from Figs. 8 to 15 inclusive.

The usher comprises a curved finger 20 having an integral fan-like tail portion 22. The usher is pivoted on an upright pin 24 set into a base block 26 with finger 20 projecting toward the advancing ware. On another pin 28 also projecting upwardly from base 26 is a circular disk 30 provided on its upper surface with radial ratchet teeth 32. The rear edge of fan 22 is arcuate about pin 24 as a center. The middle portion 34 of the arcuate edge has such a radius as to be substantially tangent to disk 30, while the end portions 36 and 38 of the edge have longer radii in order to provide projecting stops which abut against disk 30 and permit the usher to oscillate normally through a certain predetermined angle.

A portion of the rim of disk 30 is cut away in a concave arc 40 as indicated in the drawings. Mounted on top of fan 22 is a block 42 which carries a pivoted ratchet dog 44 arranged to pass freely over the teeth 32 while moving in one direction but to engage a tooth while moving in the other direction as will be understood from Fig. 11. A pin 46 (Fig. 10), operated by gravity, engages recesses 48 in base 26 to prevent retrograde movement of wheel 30.

With the above construction in mind the operation of the usher by the ware may now be considered. With projections 36 and 38 serving as stops against disk 30, the usher may normally be oscillated through a certain fixed angle as from its full-line position A to its broken line position B (Fig. 8), and vice versa. The pieces of ware, such for instance as bottles 50, are carried along by the conveyor in the general direction indicated by the arrows, into contact with the outer, convex surface of finger 20. If the usher is not already in position A the bottle pushes it to that position. The bottle, still being moved by the conveyor, then travels into contact with the edge of fan 22 which is in posiion A, and pushes it to position B. Then the next bottle in line will in like manner oscillate the usher through a complete cycle from B to A and back to B. But each complete double oscillation of the usher, by means of dog 44, rotates disk 30 an angular distance from one ratchet tooth to the next until, after a predetermined number of movements, disk 30 arrives as shown in Fig. 9, with its concave arcuate portion in such position that projection 38 is not stopped by disk 30 but is permitted to travel further than normal until the usher assumes position C (Figs. 8 and 9). When the usher is in this position the next bottle will contact with the inner (concave) side of finger 20 and will travel along that side of the finger until it contacts with the edge of fan 22 in passing which it moves the usher back to A position. Pin 49, projecting downwardly from the hub of the usher, contacts with shoulders 51 on base 26 to limit the oscillation of the usher.

The counting disk in Figs. 8 and 9 has six teeth, therefore it will pass six bottles on the convex side of the usher, then one on the concave side, and so forth. In other words, every seventh bottle passes on the concave side of the usher finger and the other six on the convex side.

If wheel 30 were replaced by the five-toothed wheel in Fig. 12 the usher would pass every sixth bottle on the convex side. In like manner the wheels in Figs. 13, 14 and 15 would pass every fifth, fourth and third bottle, respectively.

For the purpose of illustration the bottles in Fig. 8 are spaced close together. It will be appreciated that in actual service it is desirable for the bottles to be far enough apart so that only one bottle is in contact with an usher at any one time.

With the above operation of the ushers in mind, the operation of the complete system may easily be understood. Fig. 1 shows an arrangement of ushers to receive bottles in two longitudinal streams, and rearrange them in rows of fourteen bottles each crosswise of the leer. Fig. 3 shows a modified arrangement to do the same thing as Fig. 1. Fig. 4 shows part of an usher system to handle a single stream of bottles, diverting them alternately to right and left by a single non-connecting usher.

Referring to Figs. 1 and 2, bottles are delivered from molding machine 60 on to platen 62, which is raised by vertical cylinder 64 to proper height so that horizontal cylinder 66 may operate arm 68 to sweep the bottles on to conveyor 70 by which they are carried into the leer, through which the bottles are transported by a conveyor, preferably of the roller type.

As the bottles enter the leer they are deflected to the right or left by fixed deflector plate 73. Those which pass on the right encounter successively ushers R—7, R—6, R—5, R—4, R—3, and R—2, while those on the left encounter ushers L—7, L—6, L—5, L—4, L—3 and L—2. Ushers R—7 and L—7 place every seventh bottle in position to be carried by the conveyor into and through passages PR7 and PL7 respectively. Of the bottles which pass on the outside of ushers R—7 and L—7, every sixth one is admitted by ushers R—6 and L—6 into passages PR6 and PL6 respectively.

In like manner each succeeding usher admits a bottle, so that when seven bottles have passed the right and left hand ushers there is a bottle in each passage PL1 to PL7 inclusive, and PR1 to PR7 inclusive. In other words fourteen bottles of the incoming streams of ware have been arranged in a new formation crosswise of the leer. The next fourteen will in like manner be placed in a similar formation in rear of the first fourteen, and so on indefinitely.

Conveyor 72 operates to carry the bottles at comparatively high speed through the above-described distributing system. After leaving the distributor the bottles pass on to a section 74 of conveyor which moves at medium speed, and thence on to the slow section 76 upon which they are transported to the outlet end of the leer. This is illustrated diagrammatically in Fig. 7. The exact formation assumed by the bottles on the slow conveyor will depend upon the relative speeds of the conveyors and upon the distance apart of the bottles as they enter the leer. One arrangement of the fourteen-bottle rows is shown in Fig. 7. Without further explanation the distributor system in Figs. 3 and 4 will be readily understood.

The illustrated systems are adapted to place the ware in cross rows having fourteen bottles each but it will be appreciated that by suitable arrangement of ushers rows containing any desired number of bottles may be formed.

The guide passages mentioned above are formed by longitudinal bars 80, supported close above the conveyor by rows of vertical hangers 82 attached to longitudinal stringers 84 near the top of the leer. The stringers are supported by cross rods 86 provided with spacing sleeves 88 comprising short pieces of iron pipe to keep the stringers properly located laterally of the leer.

In order to prevent inadvertent tipping of tall ware, a second guide rail 90 (Fig. 5) may be provided above each lower rail 80. In the event that unusually narrow ware is being handled the width of the guide passages may be decreased by auxiliary rails in the form of angle irons 92 clamped to the sides of the regular guide rails 80 (Fig. 6). When not in use the auxiliary rails 92 may be clamped near the top of hangers 82 as indicated in Fig. 5.

Each counting usher is supported in its operative position above the conveyor by a vertical bar 94 attached at its upper end to a stringer 84 and at its lower end to a plate 96 (Figs. 8–11) which in turn is fast to base 26 of the usher. The non-counting ushers are supported for oscillation in any convenient manner, as for instance on vertical rods 98 attached to stringers 84. Deflector plate 73 (Fig. 1) is held in place by a hanger 82. In Fig. 4 the non-counting usher 100 is supported at the apex of a deflector plate 102, attached to a hanger 82.

As shown in Figs. 1, 3 and 4 a space 104 is provided longitudinally of the leer between each counting usher and the front end of the guide rail 80 immediately in the rear of that usher. This space serves the important purpose of preventing stoppage of operation of the usher by "jamming" in case two or more pieces of ware inadvertently arrive at an usher together, or so nearly together that the usher has not time to pass them singly into the guide passage. The space or gap 104 prevents jamming under such circumstances by providing room for the bottles to adjust themselves.

Attached to each usher support 94 immediately above the rear of the usher is a plate-like guard 106 (Figs. 1, 4 and 5) for the purpose of preventing any falling ware from landing on the timing wheel of the usher and possibly interfering with the operation thereof especially if the falling piece of ware should break.

Although I have illustrated and described guide rails in connection with my improved distributor, the rails are not absolutely essential to the successful operation of the system, which will function satisfactorily under usual conditions without the rails. One object of the guides is to prevent bottles of oval shape from turning sidewise when passing from a fast section of the conveyor to a slower section. When such ware turns sidewise on the conveyor it is liable to fall over on its side and in doing so it may tip other pieces as well.

Inasmuch as the leer itself is described in detail in the Shackelford application mentioned above, it will probably be sufficient to say here that the leer has brick walls 110 and bottom 112. The roof is not shown but it is adapted to rest on angle plates 114 (Fig. 5). The operative floor of the leer comprises a series of closely spaced conveyor rollers 120 each provided with a sprocket 122 on its outer end by means of which the rollers are driven. Conveyor sections 72 and 74 described above are composed of rollers 120. Power is supplied by motor 124 (Fig. 2) through chain or belt 126 and suitable gearing to operate sections 70 and 72 at comparatively high speed by means of chain 128, section 74 at medium speed by means of chain 130, and section 76 at slow speed by means of gear 132 and chain 134.

It is to be understood that the invention is not limited to the construction herein specifically illustrated but can be embodied in other forms without departure from its spirit.

I claim—

1. In a device of the class described, in combination, a conveyor adapted to move articles, and reciprocating means operable by said articles while being moved by the conveyor to direct a plurality of articles in one path and then direct a single article in another path in recurring cycles.

2. In a device of the class described, in combination, means for conveying articles, and an automatic reciprocating device operable by the articles while being moved by said conveyor for directing a predetermined plurality of articles in one direction and then a single article in another direction, in recurring cycles.

3. In a device of the class described, in combination, means for conveying articles, means for directing said articles into predetermined paths, and a device for controlling said directing means to determine the number of articles directed in each path.

4. The invention set forth in claim 3 in which said device is operable by the articles while the same are only moved by the conveying means.

5. In a device of the class described, in combination, means for conveying articles, a device operable conjointly with said conveying means for arranging said articles in predetermined formation on the conveyor, and means operable by the arranging device for controlling said device.

6. In a device of the class described, in combination, means for conveying articles, an usher operable by the articles while being moved by said conveyor, and an element operable by said usher to cause said usher to direct a predetermined number of articles in one direction, and then direct a predetermined number in another direction, in recurring cycles.

7. In a device of the class described, in combination, means for conveying articles, an usher, and a device operable by said usher to cause said usher to direct a predetermined number of pieces of ware in one direction, and then direct a predetermined number in another direction, in recurring cycles.

8. In a device of the class described, means for conveying articles at differential speeds, in combination with a direction-changing device operable by said articles while they are being conveyed, whereby the articles are arranged in predetermined formation by the conjoint action of said device and the conveyor, said device being provided with a controlling element for causing said device to direct selected articles in one direction and other articles in a different direction.

9. In a device of the class described, in combination, a series of direction changing devices, a conveyor adapted to convey articles one by one into control of each of said series of devices in turn, and a selecting element associated with each device whereby said device is caused to deflect certain of the articles toward the next device of the series and to deflect others of the articles in a different direction, substantially as described.

10. In a device of the class described, a conveyor adapted to move articles, in combination with direction changing apparatus operable on said articles while on the conveyor, said apparatus comprising a member adapted to oscillate through variable angles, and a device associated therewith for controlling the angles through which said member oscillates, for thereby controlling the position of the articles on the conveyor.

11. The invention set forth in claim 10 in which oscillation of the member is caused by the articles while being moved by the conveyor.

12. Apparatus for changing the direction of motion of articles while being moved by a conveyor, comprising in combination, a member supported for oscillation through variable angles by articles on the conveyor, and a device associated with said member for controlling the angle through which said member oscillates, for the purpose set forth.

13. The invention set forth in claim 12 in which said member is oscillated by the articles while being moved by the conveyor.

14. Apparatus for changing the direction of motion of articles while being conveyed, comprising in combination, an usher supported for oscillation through variable angles by said articles, and a ratchet device operable by said usher and arranged to control said usher whereby said usher deflects certain selected articles to the right thereof and others to the left thereof for the purpose of arranging the articles in suitable formation on the conveyor.

15. The invention set forth in claim 14 in which said member is operated by the articles themselves while being conveyed.

16. Apparatus for changing the direction of motion of articles while being conveyed, comprising in combination, an usher supported for oscillation through variable angles by said articles, and a ratchet device operable by said usher and arranged to control said usher whereby said usher deflects a predetermined plurality of articles to one side thereof, then a single article to the other side thereof, in recurring cycles, as the articles are being conveyed.

17. The invention set forth in claim 16 in which said usher is operated by the articles while being moved by conveyor.

18. A device of the class described comprising an article moving conveyor, a direction changing element, operable to direct selected articles in one direction and other articles in another direction, and means for controlling the angular movement of said direction changing element to determine the number of articles moved in each direction.

In testimony whereof I hereunto affix my signature.

JOHN MAYO.